US007983032B2

(12) United States Patent
Walker et al.

(10) Patent No.: US 7,983,032 B2
(45) Date of Patent: Jul. 19, 2011

(54) INCORPORATION OF TWO OR MORE HARD DISK DRIVES INTO A SINGLE DRIVE CARRIER WITH A SINGLE MIDPLANE CONNECTOR

(75) Inventors: Robert I. Walker, Clearwater Beach, FL (US); Odie B. Killen, Colorado Springs, CO (US); Paul K. Foisy, Dunedin, FL (US)

(73) Assignee: Jabil Circuit, Inc., St. Petersburg, FL (US)

( * ) Notice: Subject to any disclaimer, the term of this patent is extended or adjusted under 35 U.S.C. 154(b) by 109 days.

(21) Appl. No.: 12/487,460

(22) Filed: Jun. 18, 2009

(65) Prior Publication Data

US 2009/0273896 A1 Nov. 5, 2009

Related U.S. Application Data

(63) Continuation-in-part of application No. 12/246,170, filed on Oct. 6, 2008, now Pat. No. 7,944,687.

(60) Provisional application No. 60/977,669, filed on Oct. 5, 2007.

(51) Int. Cl.
*G06F 1/16* (2006.01)

(52) U.S. Cl. ............... 361/679.33; 439/108; 312/223.2; 710/300

(58) Field of Classification Search .................. 713/300; 710/300; 361/679.33, 679.34, 679.35, 679.36, 361/679.41; 709/203; 439/894, 108; 312/223.1, 312/223.2

See application file for complete search history.

(56) References Cited

U.S. PATENT DOCUMENTS

| | | | |
|---|---|---|---|
| 2003/0003816 A1* | 1/2003 | Bolognia et al. ............ | 439/894 |
| 2006/0002077 A1* | 1/2006 | Carlson et al. ............. | 361/685 |
| 2006/0139854 A1* | 6/2006 | Beyers et al. .............. | 361/600 |
| 2007/0233781 A1* | 10/2007 | Starr et al. ................ | 709/203 |
| 2009/0265564 A1* | 10/2009 | Clemo et al. .............. | 713/300 |
| 2010/0281199 A1* | 11/2010 | Fu et al. .................... | 710/300 |

* cited by examiner

*Primary Examiner* — Hung V Duong

(57) ABSTRACT

Carrier for the rack mounting of two or more data storage devices into a chassis. The carrier includes support members along the length of the carrier, to receive and retain the two or more data storage devices. The carrier further includes a single electrical communication connector to provide an electrical communication interface for all of the data storage devices in the carrier, to and from a mating connector on a board of the chassis. The carrier further includes an interposer to adapt electrical signals from the single electrical communication connector into a form that is usable by the data storage devices.

22 Claims, 11 Drawing Sheets

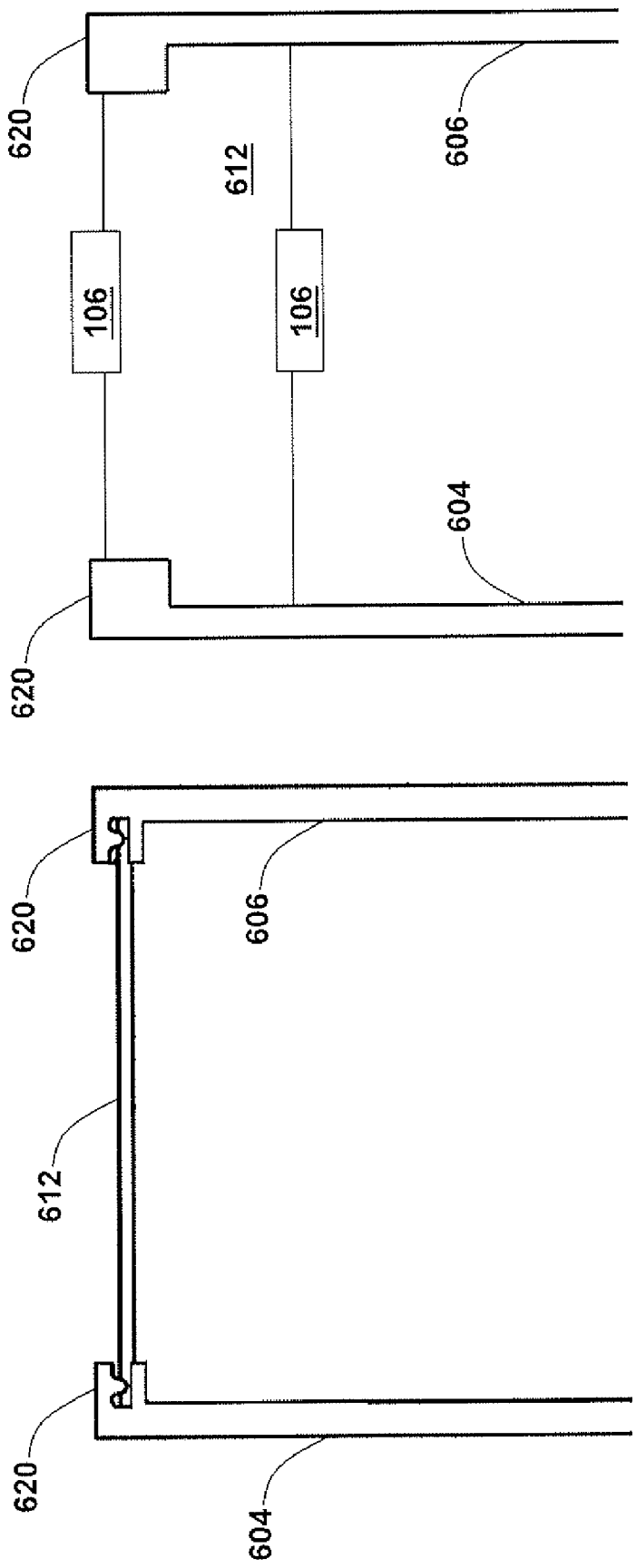

INCORPORATION OF TWO OR MORE HARD DISK DRIVES INTO A SINGLE DRIVE CARRIER WITH A SINGLE MIDPLANE CONNECTOR

CROSS REFERENCE TO RELATED APPLICATIONS

This U.S. patent application is a continuation-in-part of U.S. patent application Ser. No. 12/246,170 entitled "STORAGE DEVICE CARRIER" filed on Oct. 6, 2008, which is a non-provisional patent application of U.S. Patent Application No. 60/977,669, filed on Oct. 5, 2007 the entire contents of which are hereby incorporated by reference in their entirety.

BACKGROUND OF THE INVENTION

1. Statement of the Technical Field

The present invention relates to storage device carriers and chassis assemblies. More particularly, the present invention relates to storage device carriers comprising a support member (e.g., a tray, a sled, a frame, or a pair of rails) in which more than one storage device (e.g., a Hard Disk Drive or a Solid State Disk drive) can be inserted therein and removed therefrom as a single unit.

2. Description of the Related Art

Conventional computer systems and information networks require external data storage for storing large volumes of data. The external data storage typically includes Hard Disk Drives (HDDs) or Solid State Disk (SSD) drives. The HDD/SSD family sizes known in the related art include at least 3.5", 2.5", 1.8", 1.3" and 1.0" diameter drives.

Various mechanisms have been developed for housing the HDDs or SSD drives. One such mechanism is referred to as a hard disk drive (HDD) carrier and chassis assembly. The HDD carrier and chassis assembly accommodates the HDD and mechanically mates with the chassis assembly. During operation, an HDD is typically disposed in the HDD carrier. The HDD carrier is then inserted into a drive cage (or drive bay) in a computer chassis. An electromagnetic interface (EMI) shield is often included as part of the HDD carrier. The EMI shield functions to prevent any EMI interference from radiating outside of the computer or disk enclosure. The EMI shield also functions to reduce the susceptibility of the HDD/SDD to EMI interference originating from other components external to the EMI shield.

Often the computer chassis (enclosure or shelf) is installed into a EIU standard 'rack' of predetermined standard dimensions. The enclosure may have at least one linear dimension that is a multiple of a standard dimension. The standard dimension is referred to as a rack unit ("U" or "RU"), and multiples of this dimension are referred to as 2U, 3U, etc. The rack may be configured as a plurality of horizontal enclosures arranged in a vertical stack, where the rack unit is in a vertical direction. Alternatively, the rack may be configured as a plurality of shelves (enclosures), such that the rack unit is in a horizontal direction. Within each enclosure (shelf) there are a number of disk drives. Each disk drive may be located horizontally or vertically into the shelf. Each disk drive will be inserted into a 'Sled' or 'Disk Carrier'. Each Disk Carrier may have a PCB 'paddle card' acting as an interposer between the disk drive and a midplane circuit board. The midplane circuit board may be arranged in a plane substantially orthogonal to the plane of the plurality of Disk Carriers, wherein the midplane circuit board provides electrical interconnections within the plurality of Disk Carrier, and from the plurality of circuit boards to other portions of the computer system or vice versa. Usage of a midplane circuit board allows additional circuitry to be located in an area behind the midplane board. The additional circuitry typically includes cooling fans and a controller. If no additional circuitry is located behind the midplane, then the midplane may be equivalent to a backplane. Without limiting the embodiments described herein, the additional circuitry may be of a wide variety of designs that are either compatible or non-compatible with industry standards for rack enclosures, such as the Storage Bridge Bay ("SBB") specifications, which are known to persons of ordinary skill in the art.

Various HDD carrier (e.g., sled) and chassis assemblies have been developed that include more than one drive per carrier in a horizontal or vertical orientation, however these carriers are unable to support hot-swapping of two or more drives simultaneously. Some other HDD carrier and chassis assemblies have implemented higher drive densities, however these assemblies include only a single drive, and do not include a hot-swappable power capability. No other HDD carrier permits tool-less insertion or removal of the disk from the carrier.

Despite the advantages of the HDD carrier and chassis assembly, it suffers from certain drawbacks. For example, storage density in a chassis may be unable to fully take advantage of new, physically smaller drive sizes because the number of drives—and ultimately the storage capacity—in the chassis is limited by the size of the sled holding the drive. The size and quantity of connectors needed to interface the drives to the chassis for electrical communication has an undesirable impact upon the volumes of space able to be devoted to other functions within the chassis. The lack of a hot-swap capability results in more cumbersome maintenance procedures when a drive has to be replaced.

SUMMARY OF THE INVENTION

Embodiments of the present invention relate to a carrier for data storage devices. The carrier accommodates multiple (at least two) data storage devices mounted in a common drive carrier. The data storage devices may be mounted in the multidrive carrier by use of mechanisms including, but not limited to: a screw; rivet; captivating rail feature; and/or a tool-less carrier design. A tool-less design for this mechanism is a design which does not require the use of a tool (e.g., a screwdriver) to engage or disengage the data storage device (s) to the multi drive carrier. The tool-less carrier design is further described in copending U.S. patent application Ser. No. 12/246,170 by Walker et al., filed Oct. 6, 2008, the entire content of which is hereby incorporated by reference in its entirety. The multi drive carrier is further designed to be mounted into a chassis such as a computer rack. The chassis may include a plurality of multidrive carriers enclosed by the chassis. The data storage devices are mounted on the carrier such that one data storage device is behind or side-by-side the subsequent data storage device, thereby substantially preserving the cross-sectional dimensions of the multi drive carrier—as viewed from the direction of insertion into the chassis—compared to a single drive carrier. Usage of the multi drive carrier provides enhanced storage density in the chassis, without substantially affecting the cross-sectional dimensions of the chassis space used. The multi drive carrier may be elongated compared to a single drive carrier.

The multi drive carrier employs a single electrical communication connector, e.g., a SCA2-40 connector, to provide a hot-swappable, field-replaceable electrical communication interconnect between the multi drive carrier and the chassis enclosure via a mating connector on a midplane circuit board.

The SCA2-40 is a 40-pin Single Connector Attachment ("SCA") connector for the cabling of Small Computer System Interface ("SCSI") systems. The SCA interface may carry both data and power and also allows drive(s) to receive their configuration parameters from the midplane. Some of the pins in the SCA2-40 connector may be longer than other pins, in order to facilitate hot swapping capability. The differing pin lengths provide a preferred sequence of connection and disconnection among the pins as the connector is mated and unmated with a matching connector on the midplane. The additional length may also provide a pre-charge to alert the device to a pending power surge, allowing for a slower transition to full power, thereby making the device more stable and further facilitating hot swapping capability.

The multi drive carrier includes a support member that is sized and shaped to receive and retain the data storage devices. The multi drive carrier may also include a structure to retain the data storage devices in the support member, e.g., one or more projecting members configured to secure a drive to the multi drive carrier. Such a projecting member, if present, may extend from a portion of the multi drive carrier towards the data storage devices. The projecting member is retained in position by a structure selected from the group consisting of a rail and a sidewall of the support member. The projecting member can include a pin (or post) or screw. The support member and associated structure to retain the data storage devices in the support member are further described in copending U.S. patent application Ser. No. 12/246,170, the entire content of which are hereby incorporated by reference.

According to an embodiment of the present invention, the support member is a tray including sidewalls coupled to a planar base member. One or more of the sidewalls has at least one aperture formed therethrough sized and shaped to receive the projecting member. The projecting member is disposed on a first face of a planar plate (or pin rail) so as to project outwardly therefrom. The planar plate (or pin rail) can be secured to the support member by the rail. A light pipe is also provided that can be secured to the support member by the rail. The rail comprises a capturing structure for capturing a peripheral edge portion of a multi drive carrier termination. An EMI shielding gasket can further be provided that is captured between two or more rails and a bezel.

According to another embodiment of the present invention, the support member has a shape defined by a plurality of sidewalls. The projecting member is disposed on one of the sidewalls and extends outwardly therefrom. At least one of the sidewalls may be formed of a flexible material and/or is removably coupled to the support member. If the sidewall is removably coupled to the support member, then the sidewall can comprise a coupling structure selected from the group consisting of a hook and/or a hinge. At least one of the sidewalls also includes a capturing structure for capturing a peripheral edge portion of a paddle card for mounting in the carrier. At least one of the sidewalls can also have a light pipe embedded therein.

According to one or more embodiments of the invention, there is provided a carrier for a plurality of data storage devices, the carrier having a support member sized and shaped to receive and retain the plurality of data storage devices, the support member fittable in a chassis, and a single connector providing an electrical communication interface from the plurality of data storage devices to the chassis.

According to one or more embodiments of the invention, there is also provided a method for providing high capacity data storage in an assembly, the method including steps of inserting a plurality of data storage devices into an insert space of a support member defined by a plurality of sidewalls, removably securing the plurality of data storage devices within the support member, such that the plurality of data storage devices are in electrical communication contact with a single connector on the support member, and removably securing the support member within the assembly, such that the one connector on the support member is in electrical communication contact with the chassis.

BRIEF DESCRIPTION OF THE DRAWINGS

Embodiments of the present invention will be described with reference to the following drawing figures, in which like numerals represent like items throughout the figures, and in which:

FIG. 8A is a top view of a circuit board retained in a vertical orientation,

FIG. 8B is a top view of a circuit board retained in a horizontal orientation.

DETAILED DESCRIPTION OF THE PREFERRED EMBODIMENTS

Figure 1:
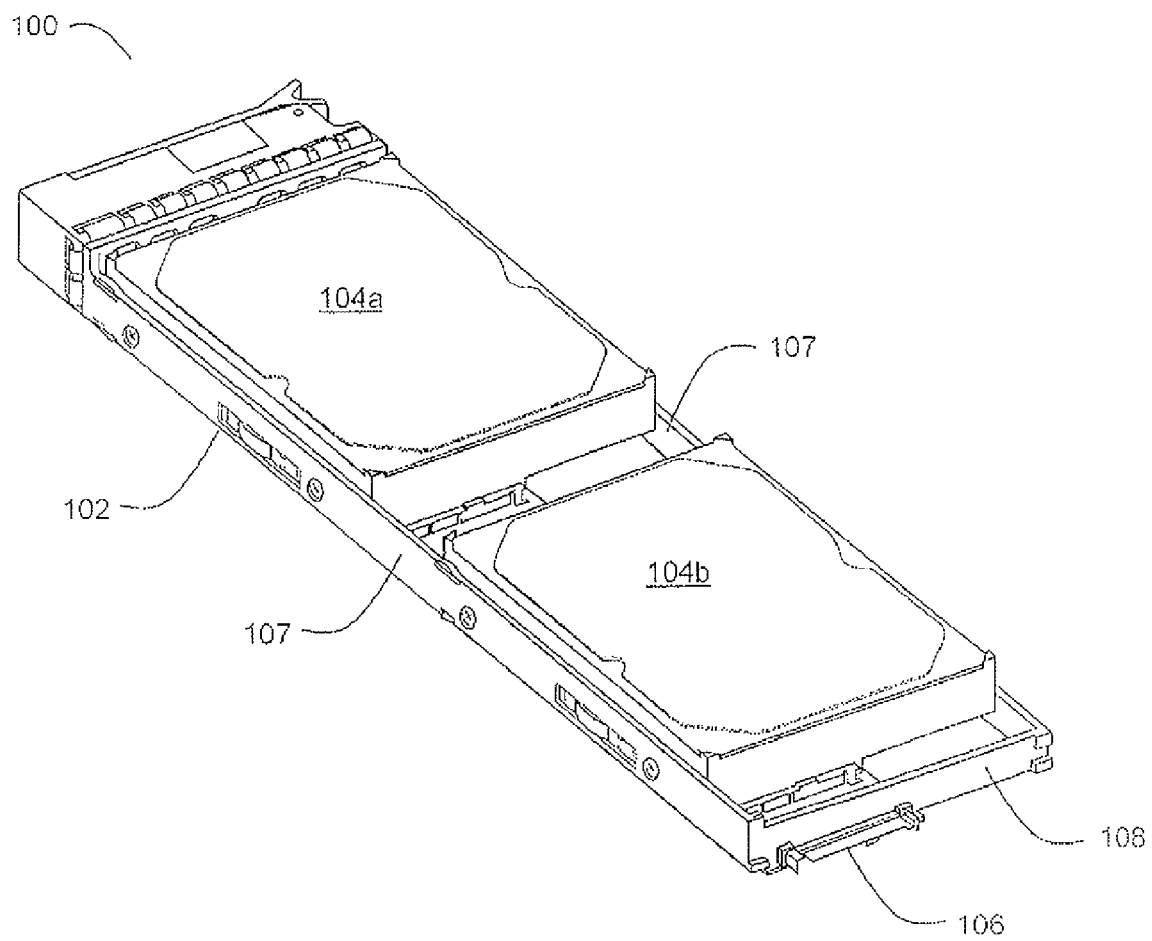
FIG. 1 is a top rear perspective view of an exemplary multi drive carrier assembly that is useful for understanding the present invention.

Embodiments of the present invention relate to a carrier for data storage devices. There is a need for higher density data storage for a computer and storage assembly. The higher density storage should be fittable within existing enclosures in one or more rack units of size. The higher data storage should provide at least 8 per 3.5" drives per rack unit ("U"), and should be front loadable and hot swappable in a chassis (as compared to 4 per 3.5" drives for a standard single disk carrier). The design should facilitate field-replacement with a minimum of operation disruption. Accordingly, embodiments of the present invention may also include a multi drive carrier fittable within a 2U enclosure and providing a total of at least 24 drives, or a multi drive carrier fittable within a 3U enclosure and providing a total of at least 32 drives, and so forth. For instance, in the 2U enclosure, the drives may be positioned two deep in a configuration that houses four drives horizontally and three drives vertically, thereby providing a total of 24 drives. A multi drive carrier is used to position the drives at least two deep. Using smaller disk drives, i.e. 2.5", 1.8", 1.0" would yield multiples of the disk drives assembled into a multi-carrier, either side-by-side or end-to-end or stacked vertically if thin enough.

The multi drive carrier may use a single electrical communication connector, e.g., a SCA2-40 connector, to provide the electrical interconnect between the multi drive carrier and the chassis enclosure via a mating connector on a midplane board. The usage of a single electrical communication connector to service both drives on the multi drive carrier allows for a reduced connector count, and associated benefits such as reduced wiring within the enclosure, compactness, and improved maintainability. The connector may be designed to provide a hot-swap capability, for instance some of the pins in the SCA2-40 connector may be longer than other pins, in order to provide a preferred sequence of connection and disconnection among the pins as the connector is mated and unmated with a matching connector on the midplane. One non-limiting example is that the ground pin may be designed to be longer than the DC power pin. A ground pin longer than the power pin will facilitate establishing a ground connection before establishing a DC power connection when inserting the multi drive carrier into a chassis, and will also facilitate a disconnection of the DC power connection before the ground connection when removing the multi drive carrier from the chassis. The additional length on certain pins may also provide a pre-charge to alert the device to a pending power surge, allowing for a slower transition to full power, thereby making the device more stable and facilitating hot swapping capability. The hot-swap capability may be supported by electronic hot swap components located on the paddle cards.

Behind the midplane board may be located circuitry that provides supporting functions for the hard drives. Such circuitry is known as an expander module. Examples of such functions include cooling (e.g., fans); UART port(s) for debugging; UARTs for Storage Enclosure Processors ("SEP") to SEP communications; networking support such as Ethernet ports for out-of-band management; and monitoring, control, and reset functions. The expander module may be designed to be SBB compliant, however, non-SBB compliant designs are supported as well.

Embodiments of the present invention provide a more compact data storage solution than the related art. Therefore, more volume within a rack or chassis is available for other uses, such as to allow for hot-swappable, redundant, power and cooling to be implemented in a high density enclosure.

Embodiments of the present invention will now be described with respect to FIGS. 1-6. Embodiments of the present invention relate to a multi drive carrier assembly for storage devices (e.g., a Hard Disk Drive or Solid State Disk drive) that can be removably housed in a chassis (e.g., a drive cage or drive bay in a computer chassis). More particularly, embodiments of the present invention concern multi drive carrier assemblies comprising support structures (e.g., a tray, a sled, a frame, or a pair of rails) in which storage devices can be inserted and retained therein, and the multi drive carrier is hot swappable and field-replaceable. In some embodiments, the multi drive carrier may facilitate the replacement of individual drives, with or without the use of tools (e.g., a screwdriver), once the multi drive carrier has been removed from the chassis.

As such, embodiments of the present invention overcome certain drawbacks of conventional storage device carrier and chassis assemblies. More particularly, multi drive carrier embodiments of the present invention facilitate improved storage densities with an improved method for inserting storage devices into, retaining storage devices in, and removing storage devices from storage device carriers. The improved method is less time consuming and cumbersome than the conventional methods of assembling and/or dissembling storage device carrier assemblies, and the improved multi drive carrier provides more data storage in a compact volume, with fewer interconnections, and a hot-swapping capability.

Before describing the multi drive carrier assemblies of the present invention, it will be helpful in understanding an exemplary environment in which the invention can be utilized. In this regard, it should be understood that the multi drive carrier assemblies of the present invention can be utilized in a variety of different applications where external data storage (e.g., a Hard Disk Drive, a Compact Disc Drive, a Solid State Disk drive, and/or a Digital Versatile Disk drive) is needed for storing large volumes of data. Such applications include, but are not limited to, computer system applications, server applications, storage appliance applications, Just A Bunch Of Disks (JBOD) storage applications, and information network applications. Accordingly, embodiments of the present invention will be described in relation to a computer system computer application where hard disk drives (HDDs) are used for storing data.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Referring now to FIG. 1, there is provided a top rear perspective view of an exemplary multi drive carrier assembly 100 according to an embodiment of the present invention. The multi drive carrier assembly 100 can be housed in a chassis (e.g., a drive cage). Chassis are well known to those having ordinary skill in the art, and therefore will not be described herein. However, it should be understood that the multi drive carrier assembly 100 can be housed in any chassis selected in accordance with a particular HDD application.

Figure 2:
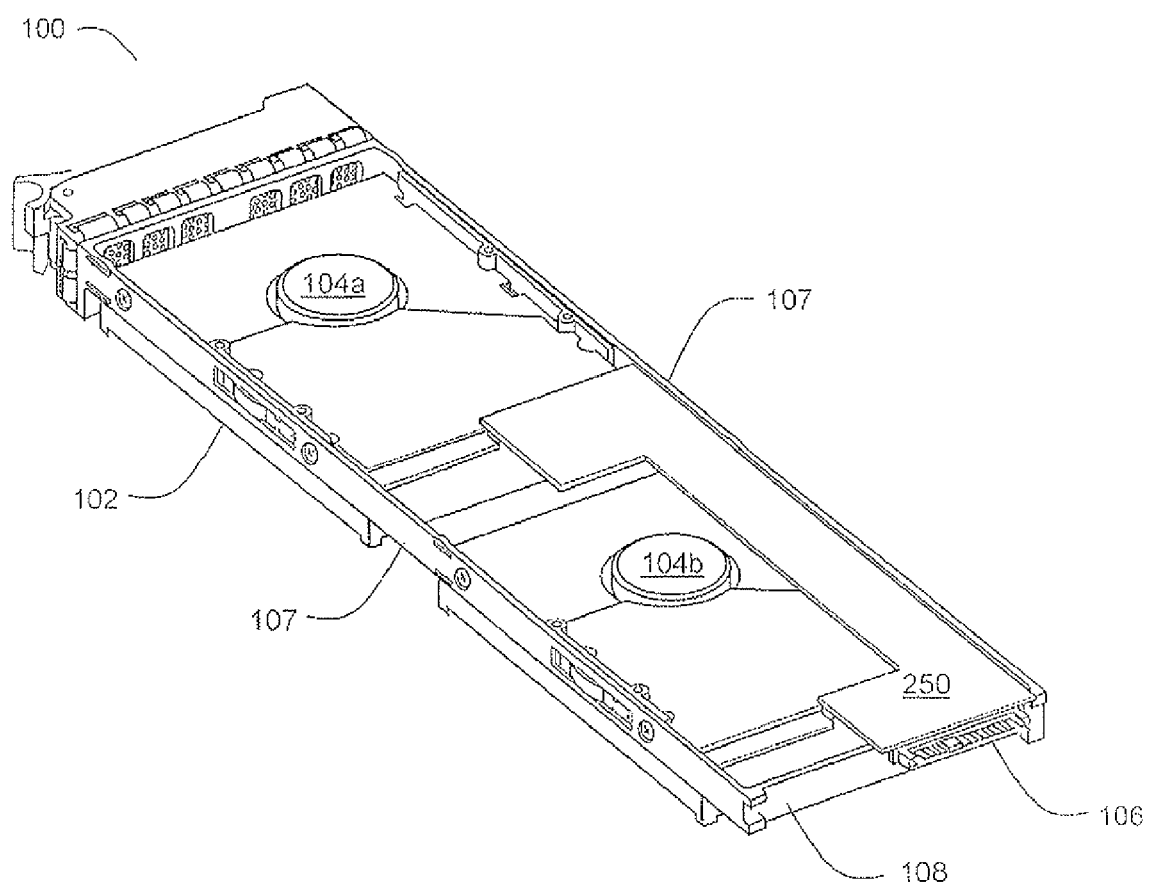
FIG. 2 is a bottom rear perspective view of an exemplary multi drive carrier assembly that is useful for understanding the present invention, showing a physical embodiment of an interposer.
Figure 3:
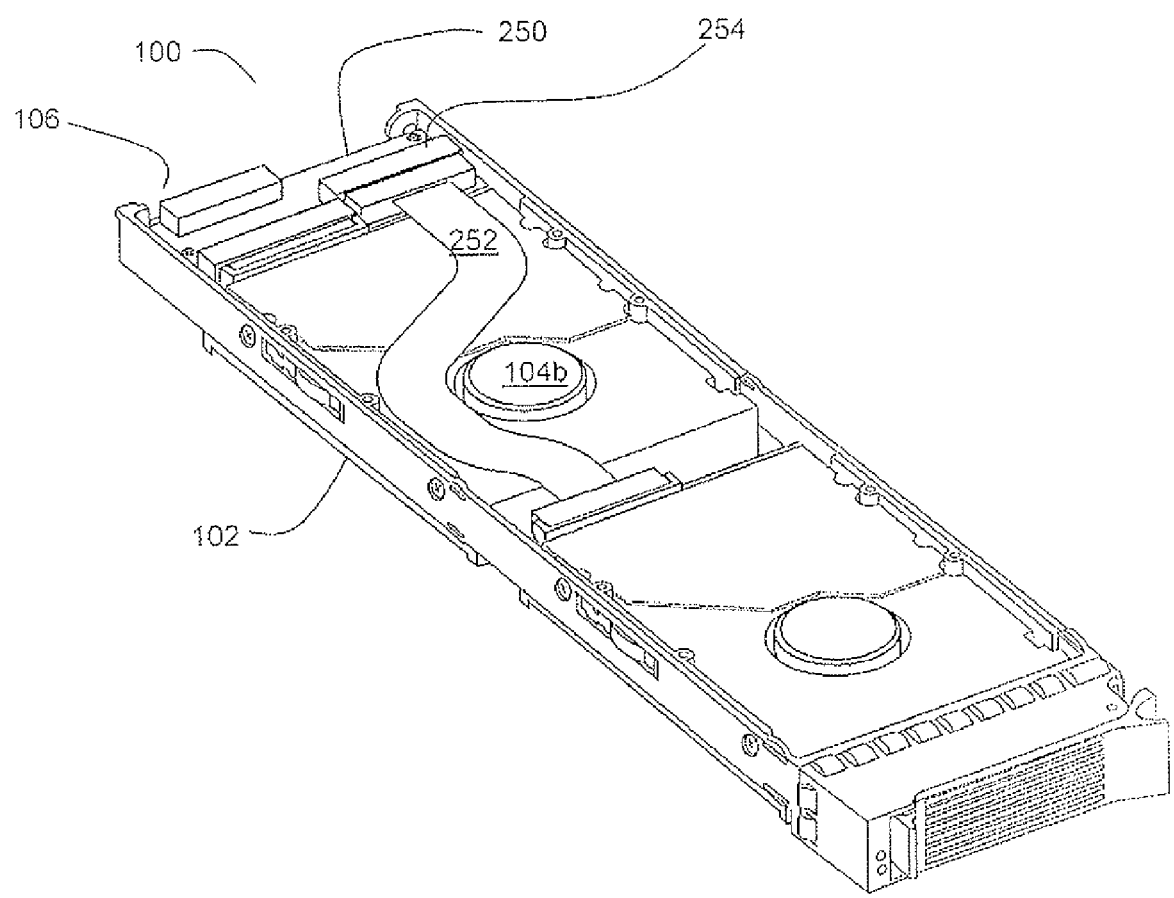
FIG. 3 is a bottom front perspective view of an exemplary multi drive carrier assembly that is useful for understanding the present invention, showing another physical embodiment of an interposer.

The multi drive carrier assembly 100 comprises a multi drive carrier 102, a first HDD 104a, a second HDD 104b (or multiples thereof), and a horizontally arranged paddle card connector 106, which may be in electrical communication with a midplane. The paddle card may be implemented on a substantially rigid or flexible printed circuit board assembly (PCBA). Support members 107 run lengthwise along the multi drive carrier 102 to support and secure HDD 104a, 104b (or multiples thereof), and may include one or more cross-members 108 to provide structural integrity. It should be noted that embodiments of the present invention are not limited to horizontally arranged PCBAs. For example, embodiments of the present invention can alternatively or additionally include vertically arranged PCBAs. The multi drive carrier 102 is generally configured for removably retaining the multiple disk drives. The multi drive carrier 102 is advantageously configured to facilitate the insertion and retention of one or both HDDs 104a, 104b therein (or multiples thereof), with or without the use of tools (e.g., screwdrivers). The multi drive carrier 102 is also advantageously configured to facilitate the removal of one or both HDDs 104a, 104b (or multiples thereof), therefrom with or without the use of tools (e.g., screwdrivers). The multi drive carrier assembly 100 is depicted in FIGS. 1-3 in a closed configuration.

Tool-less replacement of drives may be accomplished by providing a multi drive carrier having predetermined portions that can be assembled and/or disassembled by hand, enabling access to the HDDs so that an HDD may be removed from, or inserted into, the multi drive carrier without the use of tools. Apparatus and method for tool-less replacement of drives in a multi drive carrier are further described below. Apparatus and method for tool-less replacement of drives in a single drive carrier are known and are described in co-pending U.S. patent application Ser. No. 12/246,170 by Walker et al., filed Oct. 6, 2008, the entire content of which is hereby incorporated by reference in its entirety.

Other configurations of individual drives within the carrier may be used for drives having a sufficiently small physical size that fits within the size constraint of the carrier card. Although FIG. 1 shows two drives 104a, 104b arranged lengthwise along the length of the multi drive carrier 102, it may be possible to arrange physically smaller drives by rotating each drive by 90 degrees in the plane of the multi drive carrier, such that the drives are arranged having a major axis that is perpendicular to a major axis of the multi drive carrier, and arranging more than two such rotated drives crosswise along the length of the carrier. Alternatively, for drives that are thin enough, it may be possible to stack the individual drives, creating a layer of drives on the carrier card.

Printed Circuit Board assemblies are well known to those having ordinary skill in the art, and therefore will not be described herein. However, it should be understood that the PCBA is generally configured for providing various power delivery functions, control functions, power conversion functions, and electronic conversion functions. The PCBA is also generally configured to cooperatively interface with an interposer, the interposer providing functions including a Serial ATA compatible multiplexer (MUX) or Bridge connection. Interposer functions may be integrated with the PCBA to provide an integrated PCBA/interposer circuit board, an example of which is shown and described below as the interposer 250 of FIG. 2. Serial ATA compatible MUXs are also well known to those having ordinary skill in the art, and therefore will not be described herein.

HDDs 104a, 104b (or multiples thereof), are well known to those having ordinary skill in the art, and therefore will not be described herein. However, it should be understood that the HDDs 104a, 104b (or multiples thereof), is a non-volatile data storage device which stores large volumes of data. The HDDs 104a, 104b (or multiples thereof), can include, but is not limited to, a one inch (1") HDD, a one and a third inch (1.3") HDD, a one and an eight inch (1.8") HDD, a two and a half inch (2.5") HDD, a three and a half inch (3.5") HDD, and a five and a quarter inch (5.25") HDD. Disk Drives can be of the form of a traditional disk with one (1) or more spinning disks or platters. Disk Drives can also be in the form of a Solid State Disk with the use of Flash Integrated Circuits and no moving parts.

Referring now to FIG. 2, there is provided a bottom rear perspective view of the exemplary multi drive carrier assembly 100 according to an embodiment of the present invention. This view illustrates an interposer 250 connecting paddle connector 106 with the first HDD 104a and the second HDD 104b (or multiples thereof). Interposer 250 is shown implemented on a printed circuit board assembly. PCBAs are well known to those having ordinary skill in the art, and therefore will not be described herein. In the embodiment of FIG. 2 the interposer 250 includes an electrical connection to electrically connect paddle connector 106 to first HDD 104a and to second HDD 104b (or multiples thereof). The function of interposer 250 is described below.

Referring now to FIG. 3, there is provided a bottom front perspective view of the exemplary multi drive carrier assembly 100 according to another embodiment of the present invention. This view illustrates an interposer 250 electrically connecting paddle connector 106 with the second HDD 104b. The PCBA implementing interposer 250 further includes a connector 254 to electrically connect the second HDD 104b to the first HDD 104a (or multiples thereof), via a flexible cable 252. Flexible cable 252 is shown in the embodiment of FIG. 3 as a ribbon cable, which is well known to those having ordinary skill in the art, and therefore will not be described herein.

FIGS. 1, 2 and 3 omit certain details with respect to the attachment of the HDDs 104a, 104b to the multi drive carrier, or with respect to the insertion and securing of the multi drive carrier within the chassis, or shielding or providing of visual status indicators. Such details may include (or not include) one or more of a bezel, an ejection handle, a damper mechanism, EMI shielding, slide rails, light pipe, pin rails, springs, attachment member, and support member. Certain details of the tool-less insertion and removal of drives from the multi drive carrier assembly 100 are described below with respect to FIGS. 6A-8B.

Figure 4:
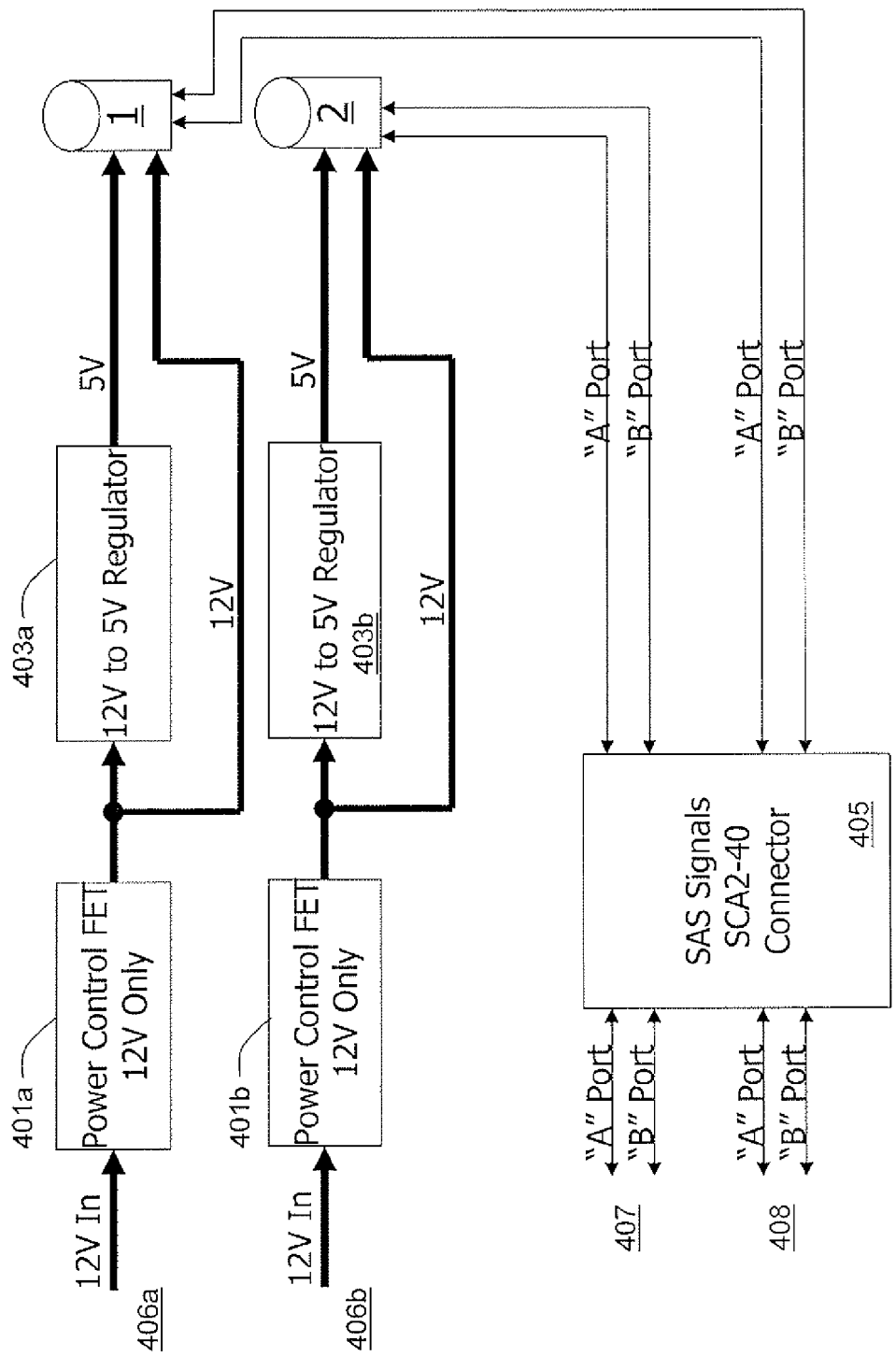
FIG. 4 is a block diagram of an SAS interposer.

Referring now to FIG. 4, there is provided an electrical block diagram of one embodiment of interposer 250. The embodiment of FIG. 4 is referred to as a Serially Attached SCSI ("SAS") interposer, which is adapted to provide an interface from the disk drives using a SAS interface to a SCSI interface and vice versa, in particular a parallel SCSI interface provided via a SCA2-40 connector. In this embodiment, interposer 250 provides an interface to accept dual 12 volt input power lines 406a, 406b. The 12 volt input power lines 406a, 406b may contain higher frequency components originating from, e.g., residual power supply AC voltage or transients caused by other circuitry (not shown) that is powered by the same power supply being switched on or off. The 12 volt input power is controlled and conditioned by power conditioners 401a, 401b respectively. The power conditioners 401a, 401b may be implemented as power control FETs. The power conditioners 401a, 401b provide controlled 12 volt signals having lesser undesirable frequency content and providing the ability to turn on and off the power to the individual disk drives. Power conditioners are known in the art and are not described herein further. The controlled 12 volt signals are provided to 12v to 5v regulators 403a, 403b, respectively. Regulators 403a, 403b provide a regulated 5 volt signal derived from the controlled 12 volt signals. The controlled 12 volt signals and regulated 5 volt signals are then provided to disk drives 1, 2 to power the disk drives. Note that while FIG. 4 shows 2 circuits, the same paddle card may provide Power and Bridging or MUX for multiple disk drives.

Interposer 250 further provides a SCA2-40 connector 405 to provide a SCSI interface for two pair of "A" port and "B" port signals 407, 408, each pair of port signals 407, 408 providing control signals to—and data read back from—one of disk drives 1, 2, respectively. For instance, the "A" port may provide commands to the respective disk drive, and the "B" port may read back data from the disk drive, or vice versa. Each pair of port signals 407, 408 is implemented at a physical level (not shown) as a +/− differential wire pair. FIG. 4 schematically shows port control signal pair 407 interfacing with disk drive 2, and port control signal pair 408 interfacing with disk drive 1. Persons skilled in the art of disk drive design will recognize that certain functions such as clocking and enabling signals used to support data transfers to and from disk drives 1, 2 (or multiples thereof), are not shown in FIG. 4 for sake of simplicity.

The 12 volt inputs 406a, 406b and the power control and regulator functions 401a, 401b, 403a, 403b are duplicated for each of the drives on the multi drive carrier. However, a single SCA2-40 connector services all of the disk drives installed in the multi drive carrier.

Figure 5:
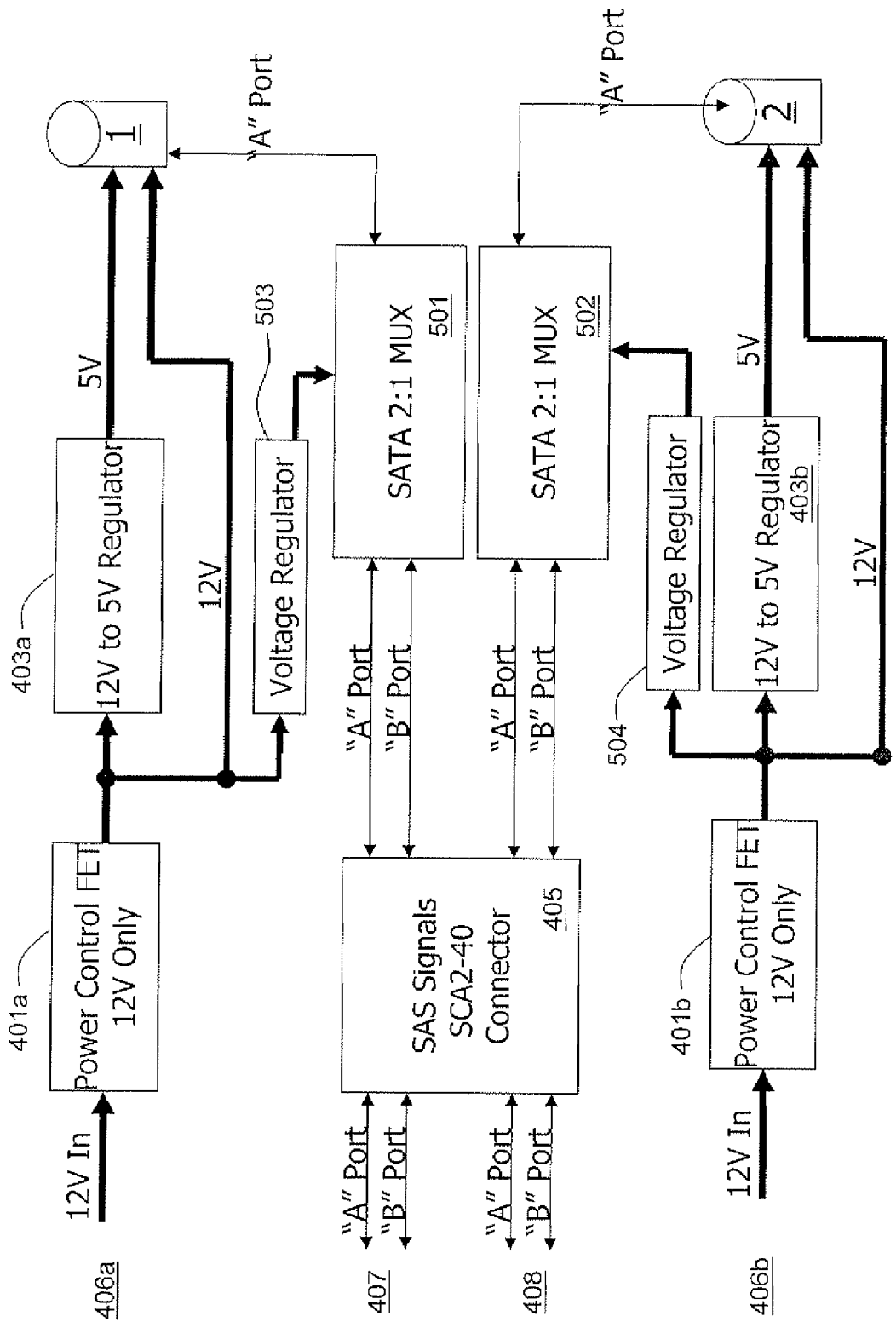
FIG. 5 is a block diagram of a SATA interposer.

Referring now to FIG. 5, there is provided an electrical block diagram of another embodiment of interposer 250. The embodiment of FIG. 5 is referred to as a Serially Attached ATA ("SATA") interposer, which is adapted to provide an interface from the disk drives using a SATA interface standard to a SCSI interface and vice versa, in particular a parallel SCSI interface provided via a SCA2-40 connector. In this embodiment, as with the embodiment of FIG. 4, interposer 250 provides an interface to accept dual 12 volt input power lines 406a, 406b. The 12 volt input power lines 406a, 406b may contain higher frequency components originating from, e.g., residual power supply AC voltage or transients caused by other circuitry (not shown) that is powered by the same power supply being switched on or off. The 12 volt input power is controlled and conditioned by power conditioners 401a, 401b respectively. The power conditioners 401a, 401b may be implemented as power control FETs. The power conditioners 401a, 401b provide controlled 12 volt signals having lesser undesirable frequency content. Power conditioners are known in the art and are not described herein further. The controlled 12 volt signals are provided to 12v to 5v regulators 403a, 403b, respectively. Regulators 403a, 403b provide a regulated 5 volt signal derived from the controlled 12 volt signals. The controlled 12 volt signals and regulated 5 volt signals are then provided to disk drives 1, 2 to power the disk drives.

SAS design standards, commands, and protocols are known to persons of skill in the art of disk drive design. SAS includes certain design features facilitating the usage of SAS with multiple drives, including multiple SATA drives. These design features may include: multiplexing to improve bandwidth utilization, by enabling two lower rate links to share a higher rate link; zoning, which enables partitioning of a logical domain into smaller sets of accessible devices; self-discovering expander devices, to facilitate topology initialization and detection of changes; diagnostics and robustness, to improve status reporting and error notification; and affiliation support, to enable certain types of disk drives to respond to more than one host.

The embodiment of FIG. 5 further includes multiplexers 501, 502 which convert between the SATA interface used by disk drives 1, 2 to/from the SAS signals provided by the SCA2-40 connector 405. The function of multiplexers 501, 502 is to convert a single-ported SATA drive into a multi-ported SATA drive. Multi port disk drives enable a processor to perform two simultaneous data accesses, one via each of the ports of the disk drive. The multiplexers 501, 502 are intelligent and provides functions such as command interleaving, multi-porting and native command queuing support (NCQ). Voltage regulators 503, 504 provide power of a predetermined voltage to multiplexers 501, 502. Note that whilst FIG. 5 shows 2 circuits, the same paddle card may provide Power and Bridging or MUX for multiple disk drives.

Figure 6A:
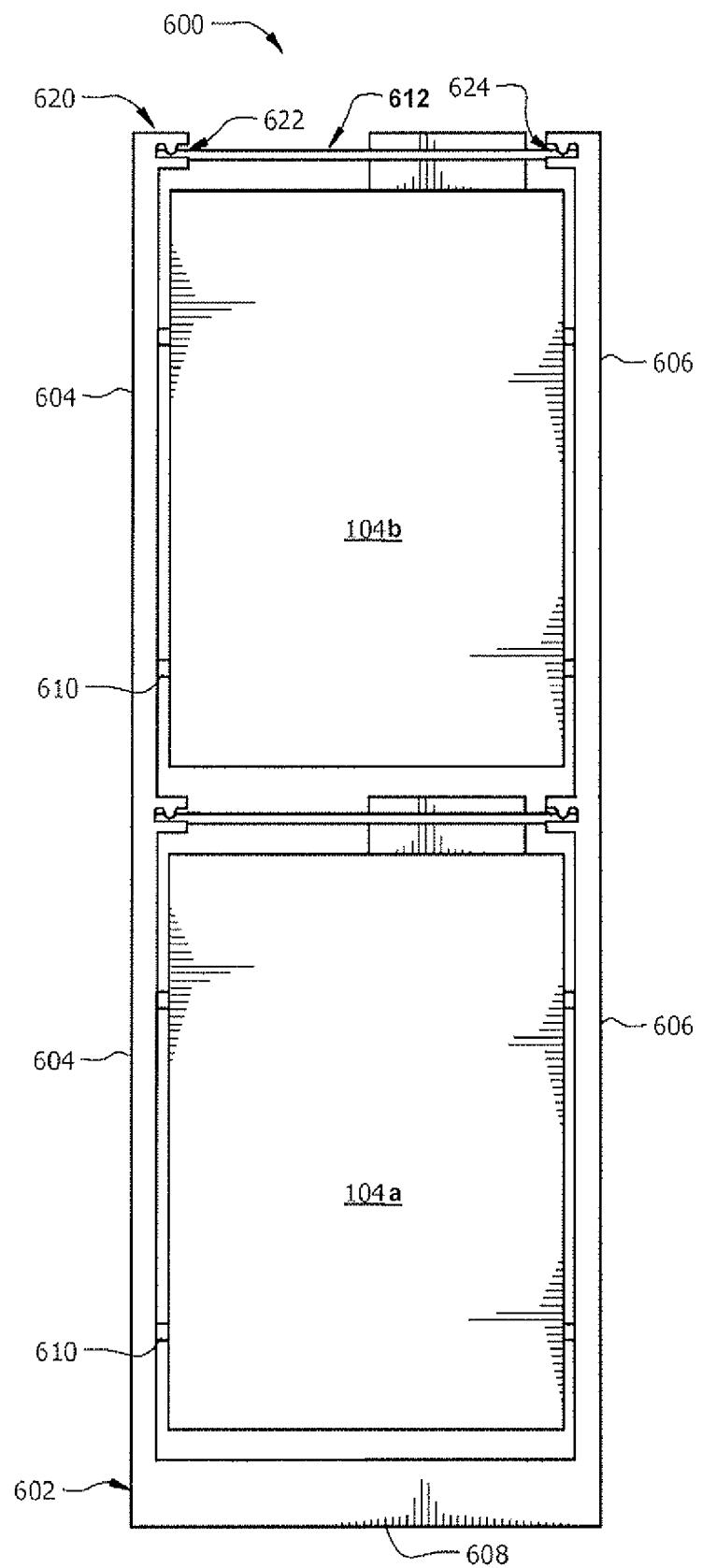
FIG. 6A is a top view of a second alternative embodiment of a multi drive carrier assembly in a closed position that is useful for understanding the present invention.
Figure 6B:
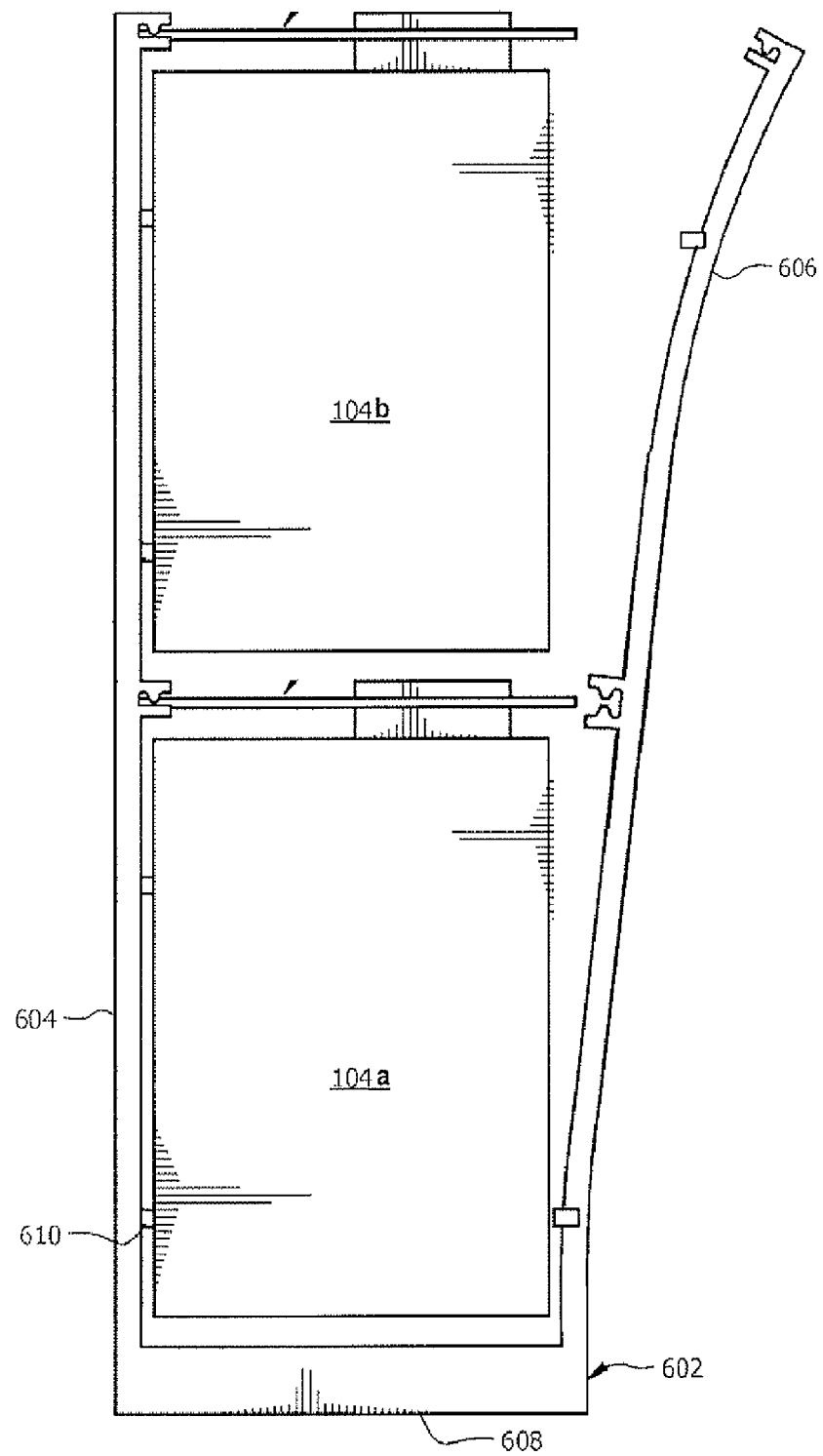
FIG. 6B a top view of the multi drive carrier assembly of FIG. 6A in a partially open position that is useful for understanding the present invention.

Referring now to FIGS. 6A-6B, there are provided top views of another exemplary multi drive carrier assembly 600 according to an embodiment of the present invention. The top view of FIG. 6A shows the multi drive carrier assembly 600 in a closed position. In contrast, the top view of FIG. 6B shows the multi drive carrier assembly 600 in a partially opened position. In the opened position, either or both of the HDD 104a, 104b (or multiples thereof) can be inserted in or removed from a multi drive carrier 602. Similarly, a vertically arranged PCBA 612 used as a paddle card can be inserted in or removed from the multi drive carrier 602.

As shown in FIGS. 6A-6B, the multi drive carrier 602 is generally in the shape of a semi-enclosed rectangle. The multi drive carrier 602 comprises three (3) sidewalls 604, 606, 608. The sidewalls 604, 606, 608 can be coupled together via an adhesive or other suitable coupling means. The sidewalls 604, 606, 608 can also be integrally molded as a single component during an injection molding process or machined as a single component during a machining process. At least one of the sidewalls 606 is formed of a flexible material, such as a softer compound plastic then that of components 604, 608 or a rubber. As such, the flexible sidewall 606 can be bent away from the other sidewall 604 so as to permit the insertion/removal of the components 104a, 104b, 612 to/from the multi drive carrier 602.

Each of the sidewalls 604, 606 comprise one or more pins (or posts) 610 extending therefrom. The pins 610 facilitate the retention of the HDD 104a, 104b (or multiples thereof) within the multi drive carrier 602. The pins 610 can have any size and shape suitable for insertion through apertures (not shown) formed in the HDD 104a, 104b. (or multiples thereof) In effect, the pins 610 removably retain the HDD 104a, 104b (or multiples thereof) to the multi drive carrier 602.

Each of the sidewalls 604, 606 is also configured to removably capture the PCBA 612. In this regard, it should be understood that each of the sidewalls 604, 606 may include a tooled or tool-less capturing member 620 extending away therefrom. Capturing member 620 may also be mounted perpendicular to sidewalls 604, 606. Alternatively, the capturing member 620 may include a brace material that is part of the sidewalls 604, 606, or a separate piece altogether. The capturing member 620 defines a channel 622 for receiving at least a portion of the PCBA 612 (as shown in FIGS. 6A-6B). The capturing member 620 can have a grip 624 disposed in the channel 622 for gripping a surface or edge of the PCBA 612. The capturing member 620 can also ensure that the PCBA 612 is aligned with the HDD 104a, 104b when they are being retained within the multi drive carrier 602.

Grip 624 of capturing member 620 is depicted as a single dimple, but grip 624 may also include one or more of: dimple; ridge; ball stud; latch; locking pin; magnet; C clip; cotter pin; and any other form of retention mechanism. The retention mechanism may engage with PCBA 612 on a single side of PCBA 612, or on both sides of PCBA 612, or an edge of PCBA 612. The locking mechanism 624, 622 do not have to utilize the PCB 612 to act as the support brace from one side rail to the other. The design may embody a separate plastic or other material 'brace' from one side to the other providing additional mechanical rigidity. Various physical arrangements of the retention mechanism within capturing member 620 are usable and well known to a person of ordinary skill in the art, and are not discussed herein further.

Although not shown in FIGS. 6A-6B, the multi drive carrier assembly 600 can also comprise a damper mechanism (not shown), an ejection handle (not shown), a bezel (not shown), an EMI shielding gasket (not shown), and a light pipe (not shown) similar to that shown in FIGS. 1-3. It should also be noted that the multi drive carrier 602 is absent of a planar support member. Still, the invention is not limited in this regard. For example, the flexible sidewall can also be implemented in an HDD carrier comprising a support member.

Figure 7A:
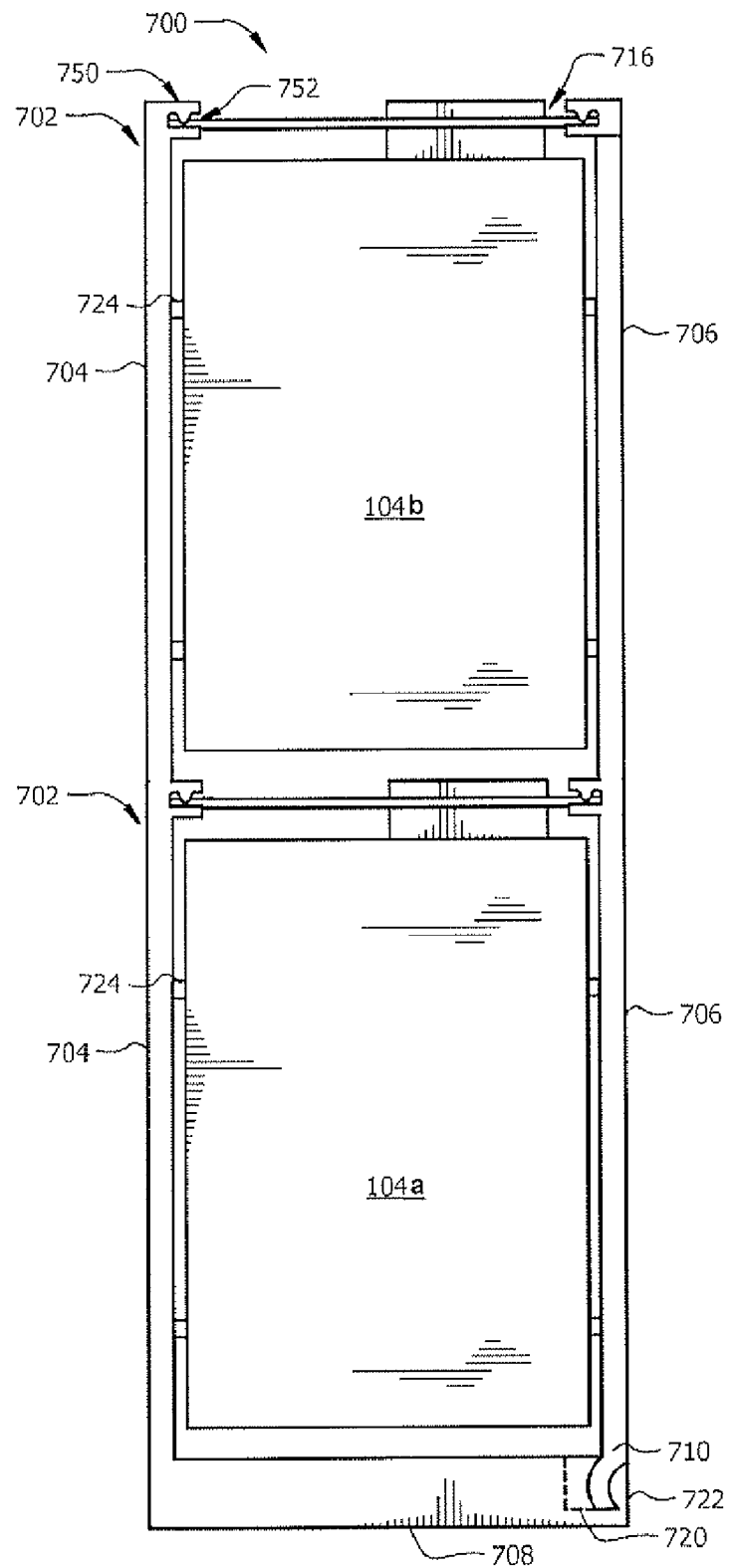
FIG. 7A is a top view of a third alternative embodiment of a multi drive carrier assembly in a closed position that is useful for understanding the present invention.
Figure 7B:
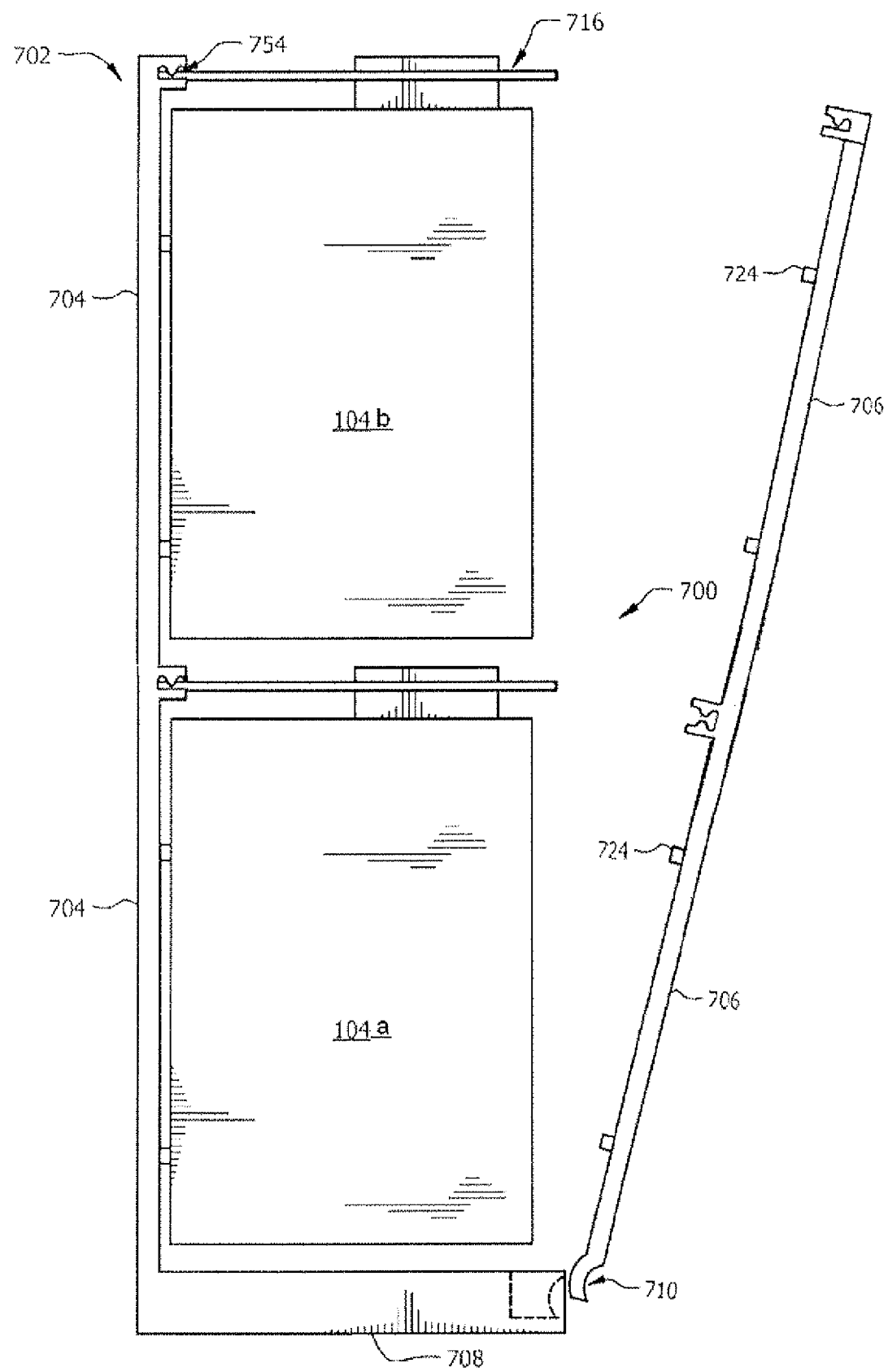
FIG. 7B is a top view of the multi drive carrier assembly of FIG. 7A in a partially open position that is useful for understanding the present invention.

Referring now to FIGS. 7A-7B, there are provided top views of yet another exemplary multi drive carrier assembly 700 according to an embodiment of the present invention. The top view of FIG. 7A shows the multi drive carrier assembly 700 in a closed position. In contrast, the top view of FIG. 7B shows the multi drive carrier assembly 700 in a partially opened position. In the opened position, the HDD 104a, 104b (or multiples thereof) can be inserted in or removed from a multi drive carrier 702. Similarly, the vertically arranged PCBA 716 can be inserted in or removed from the multi drive carrier 702.

As shown in FIGS. 7A-7B, the multi drive carrier 702 is generally in the shape of a semi-enclosed rectangle. The multi drive carrier 702 comprises three (3) sidewalls 704, 706, 708. The sidewalls 704, 708 can be coupled together via an adhesive or other suitable coupling means. The sidewalls 704, 708 can also be integrally molded as a single component during an injection molding process or machined as a single component during a machining process. The sidewalls 704, 708 can be formed of any suitable material, such as a metal material, a composite material, and a plastic.

The sidewall 706 is configured for being removably coupled to the sidewall 708. In this regard, it should be understood that the sidewall 706 comprises a tool-less coupling structure. The tool-less coupling structure can include a hook 710 (as shown in FIGS. 7A-7B), a hinge (not shown), or any other suitably coupling structure. The hook 710 is configured for being inserted into an aperture 720 formed in the sidewall 708 of the multi drive carrier 702 and engaging a stub 722 disposed within the aperture 720. The sidewall 706 can be formed of any suitable material, such as a metal material, a composite material, and a plastic.

Each of the sidewalls 704, 706 comprise one or more tool-less securing structures. The tool-less securing structures can include, but are not limited to, pins (or posts) 724 extending away from the sidewalls 704, 706. The pins 724 facilitate the retention of the HDD 104a, 104b within the multi drive carrier 702. The pins 724 can have any size and shape suitable for insertion through apertures (not shown) formed in the HDD 104a, 104b. In effect, the pins 724 removably retain the HDD 104a, 104b (or multiples thereof) to the multi drive carrier 702.

Each of the sidewalls 704, 706 is also configured to removably capture the PCBA 716. In this regard, it should be understood that each of the sidewalls 704, 706 comprises a u-shaped tool-less capturing member 750 extending away therefrom. The capturing member 750 defines a channel 752 for receiving at least a portion of the PCBA 716 (as shown in FIGS. 7A-7B). The capturing member 750 can have a grip 754 disposed in the channel 752 for gripping a surface or edge of the PCBA 716. The capturing member 750 can also ensure that the PCBA 716 is aligned with the HDD 104a, 104b when they are being retained within the multi drive carrier 702. The locking mechanism 750 does not have to utilize the PCB 716 to act as the support brace from one side rail to the other. The design may embody a separate plastic or other material 'brace' from one side to the other providing additional mechanical rigidity.

Although not shown in FIGS. 7A-7B, the multi drive carrier assembly 700 can also comprise a damper mechanism (not shown), an ejection handle (not shown), a bezel (not shown), an EMI shielding gasket (not shown), and a light pipe (not shown) similar to that shown in FIGS. 1-3. It should also be noted that the multi drive carrier 702 is absent of a planar support member (such as the support member 228 of FIGS. 2-3). Still, the invention is not limited in this regard. For example, the removable sidewall can also be implemented in an HDD carrier comprising a support member.

Referring now to FIGS. 8A-8B, there is provided a top view of two embodiments of the orientation of PCBA 612 within capturing member 620. Embodiments of the orientation of PCBA 716 within capturing member 750 are substantially similar to that of PCBA 612 within capturing member 620. FIG. 8A illustrates a top view of a first embodiment of the orientation, wherein PCBA 612 is arranged vertically, perpendicular to the plane of a HDD (not shown), and capturing member 620 configured to hold PCBA 612 in a vertical configuration. A substantially similar arrangement is shown in FIGS. 6A-6B. FIG. 8B illustrates a top view of a second embodiment of the orientation, wherein PCBA 612 is arranged horizontally, parallel to the plane of a HDD (not shown), and capturing member 620 configured to hold PCBA 612 in a horizontal configuration. The capturing member 620 of FIG. 8B is rotated substantially 90 degrees with respect to the orientation of capturing member 620 of FIG. 8A.

Figure 9:
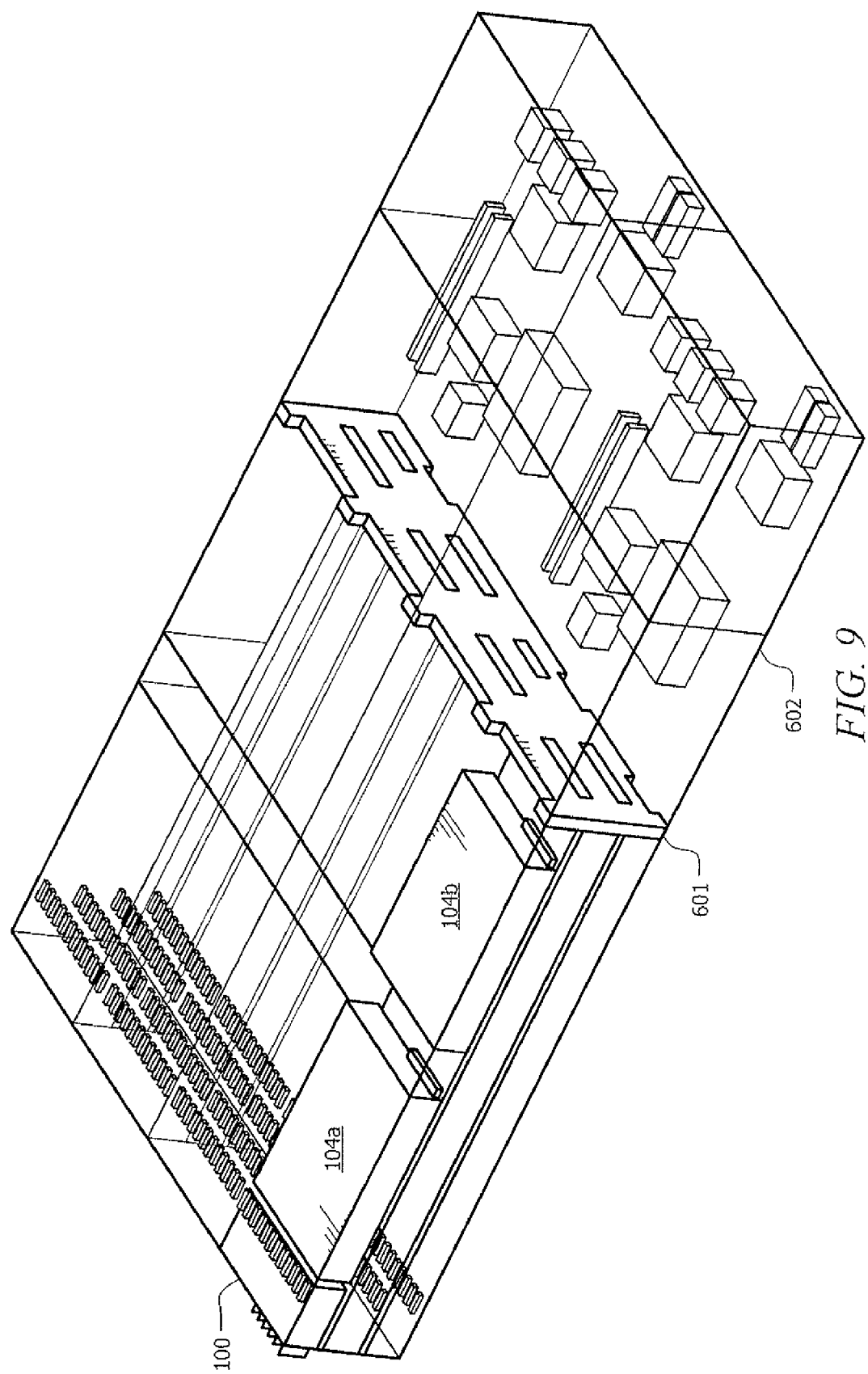
FIG. 9 is a top rear wireframe perspective view of a portion of a chassis having installed within it one exemplary multi drive carrier assembly.

Referring now to FIG. 9, there is provided a top rear wireframe perspective view of a portion of a chassis having installed within it one exemplary multi drive carrier assembly 100 according to an embodiment of the present invention. Although this view illustrates only one exemplary multi drive carrier assembly 100, the portion of the chassis shown is large enough to accommodate a total of 12 such multi drive carrier assemblies in a 2U enclosure. Behind multi drive carrier assembly 100 is located midplane board 601. A description of a midplane board such as midplane board 601 has been provided earlier. Behind midplane board 601 is located expander module 602, which provides supporting functions to the chassis as described earlier.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

We claim:

1. A carrier for a plurality of data storage devices, comprising:
   a support member sized and shaped to receive and retain the plurality of data storage devices, the support member fittable in a chassis;
   a single connector providing an electrical communication interface from the plurality of data storage devices to the chassis;
   at least one projecting member configured to retain each of the data storage devices in the support member, the at least one projecting member extending from a portion of the carrier towards the data storage device; and
   wherein each of the at least one projecting member is retained in position by a structure selected from the group consisting of a rail and a sidewall of the support member.

2. The carrier according to claim 1, wherein the electrical communication interface comprises a SCA2-40 connector.

3. The carrier according to claim 1, wherein the electrical communication interface comprises a paddle card connector.

4. The carrier according to claim 1, wherein the plurality of data storage devices are arranged lengthwise along the length of the carrier.

5. The carrier according to claim 1, wherein the plurality of data storage devices are arranged crosswise along the length of the carrier.

6. The carrier according to claim 1, wherein the plurality of data storage devices are arranged in a vertically stacked manner along the length or across the width of the carrier.

7. The carrier according to claim 6, wherein the interposer is implemented on a substantially rigid PCBA.

8. The carrier according to claim 6, wherein the interposer is implemented on a substantially flexible printed circuit.

9. The carrier according to claim 6, wherein the interposer is implemented by use of cables.

10. The carrier according to claim 6, wherein the interposer provides an interface between SAS signals at the connector to SAS signals at the plurality of data storage devices.

11. The carrier according to claim 6, wherein the interposer provides an interface between SAS signals at the connector to SATA signals at the plurality of data storage devices.

12. The carrier according to claim 1, further comprising an interposer connecting the connector to the plurality of data storage devices.

13. The carrier according to claim 1, wherein the electrical communication interface further comprises a PCBA to provide a communication connection from the plurality of data storage devices to the connector.

14. The carrier according to claim 1, wherein the electrical communication interface further comprises a flexible cable to provide a communication connection from at least one of the data storage devices to the connector.

15. The carrier according to claim 2, wherein the SCA2-40 connector provides a hot-swap capability.

16. The carrier according to claim 15, further comprising a plurality of sidewalls formed of a flexible material.

17. The carrier according to claim 1, wherein the data storage devices are removable from the carrier without the use of tools.

18. The carrier according to claim 1, wherein the carrier is fittable within a predetermined multiple of rack unit space.

19. The carrier according to claim 1, wherein at least one of the plurality of sidewalls is formed of a flexible material.

20. The carrier according to claim 1, wherein a first sidewall of the plurality of sidewalls is removably coupled to a second sidewall of the plurality of sidewalls.

21. The carrier according to claim 1, wherein the first sidewall comprises a coupling structure selected from the group consisting of a hook and a hinge.

22. The carrier according to claim 1, wherein the rail comprises a capturing structure for capturing a peripheral edge portion of a paddle card termination.

* * * * *